| United States Patent [19] | [11] Patent Number: 4,705,763 |
| Hayashi et al. | [45] Date of Patent: Nov. 10, 1987 |

[54] HIGH ZIRCONIA FUSED REFRACTORY PRODUCT

[75] Inventors: Atsushi Hayashi, Tokyo; Kiyoharu Kuwabara, Yokohama; Kohzo Sakai, Kawasaki; Toshihiro Ishino, Takasago, all of Japan

[73] Assignee: Asahi Glass Company Ltd., Tokyo, Japan

[21] Appl. No.: 898,497

[22] Filed: Aug. 21, 1986

[30] Foreign Application Priority Data

Sep. 10, 1985 [JP] Japan ................................. 60-198674

[51] Int. Cl.$^4$ ............................................. C043 35/48
[52] U.S. Cl. ...................................... 501/103; 501/105
[58] Field of Search ......................... 501/103, 104, 105

[56] References Cited

U.S. PATENT DOCUMENTS

| 3,132,953 | 5/1964 | Alper et al. | 501/105 |
| 3,519,448 | 7/1970 | Alper et al. | 501/103 |
| 3,632,359 | 1/1972 | Alper et al. | 501/103 |
| 4,336,339 | 6/1982 | Okumiya et al. | 501/103 |

FOREIGN PATENT DOCUMENTS

| 2478622 | 9/1981 | France | 501/105 |
| 0085610 | 11/1973 | Japan | 501/105 |
| 0121012 | 10/1978 | Japan | 501/105 |
| 1178738 | 9/1985 | U.S.S.R. | 501/105 |

*Primary Examiner*—Mark L. Bell
*Attorney, Agent, or Firm*—Oblon, Fisher, Spivak, McClelland & Maier

[57] ABSTRACT

A high zirconia fused refractory product consisting essentially of the following constituents analytically, on a weight basis:

85 to 97% of $ZrO_2$;
0.05 to 3% of $P_2O_5$;
2 to 10% of $SiO_2$;
0.05 to 5% of $B_2O_3$; and
the content of alkali metal oxides being less than 0.1%.

8 Claims, No Drawings

HIGH ZIRCONIA FUSED REFRACTORY PRODUCT

The present invention relates to a high zirconia fused refractory product having high corrosion resistance, which is especially suitable for a molten glass tank. More particularly, it relates to such a refractory product suitable also for melting a low alkali glass or for electrically melting a glass.

A fused refractory product is usually obtained by completely melting a specific composition of refractory materials in an electric furnace, pouring the molten composition into a casting mold having a prescribed shape, and annealing it to the ambient temperature to resolidify the composition. The fused refractory product is commonly known as a high grade refractory product which is quite different from a fired or non-fired rebonded refractory product in respect of the structure and the manner of its preparation.

Among such fused refractory products, a high zirconia fused refractory product containing about 90% of $ZrO_2$ is widely used as a refractory material for melting a glass in view of the excellent corrosion resistance of $ZrO_2$ against a molten glass. However, a high zirconia fused refractory product composed mainly of $ZrO_2$ crystals (baddeleyite) is known to have a difficulty such that it is hardly possible to control the abnormal expansion and contraction which are characteristics specific to $ZrO_2$, whereby it is difficult to obtain a cast product of a block shape having no cracks.

Under the circumstances, it has been proposed to incorporate $SiO_2$ and other components into a cast refractory product containing about 90% or more of $ZrO_2$, for instance, in U.S. Pat. No. 3,519,448 or 4,336,339, or in Japanese Unexamined Patent Publication No. 85610/1973 or No. 121012/1978. U.S. Pat. No. 3,519,448 proposes to incorporate a rare earth oxide to stabilize $ZrO_2$. Japanese Unexamined Patent Publication No. 85610/1973 proposes to incorporate $SiO_2$, $Al_2O_3$, CuO and $B_2O_3$ to form a glassy phase at the grain boundary of $ZrO_2$ so that the expansion and contraction of $ZrO_2$ are thereby absorbed. Likewise, Japanese Unexamined Patent Publication No. 121012/1978 proposes to form a glassy phase composed of $SiO_2$, CaO and MgO, and U.S. Pat. No. 4,336,339 proposes to form a glassy phase composed of $SiO_2$, $Al_2O_3$ and $P_2O_5$, to eliminate cracks in cast products.

In conventional high zirconia fused refractory products, a small amount of a glassy phase is formed in the matrix to absorb the expansion and contraction of $ZrO_2$. Accordingly, the glass matrix is desired to be soft, and therefore it is necessary to incorporate certain additives in addition to the $SiO_2$ which is the main component of the glass matrix. For instance, in Japanese Unexamined Patent Publication No. 85610/1973, CuO or $B_2O_3$ is incorporated, in Japanese Unexamined Patent Publication No. 121012/1978, CaO and MgO are incorporated, and in U.S. Pat. No. 4,336,339, $P_2O_5$ is incorporated. Among them, in Japanese Unexamined Patent Publication No. 121012/1978, the glass matrix component is composed solely of $SiO_2$, CaO and MgO, and the matrix glassy phase will be necessarily hard, whereby it will be difficult to obtain a cast product free from cracks. In Japanese Unexamined Patent Publication No. 85610/1973 and in U.S. Pat. No. 4,336,339, it is disclosed that $Na_2O$ is effective for the formation of a soft glass matrix although they tend to deteriorate the corrosion resistance against glass if incorporated in an excess amount, and that the presence of a small amount thereof is desirable. However, when a recent glass composition containing a minimum amount of an alkali component is melted, an alkali metal oxide contained in the glass phase is likely to melt into the glass substrate. Further, the alkali metal oxide has a high ionic electric conductivity at high temperatures, and tends to decrease the overall resistivity of the refractory product at high temperatures, such being undesirable for a refractory product to be used for electrically melting a glass.

Accordingly, it is an object of the present invention to overcome the above-mentioned difficulties and to provide a cast product which is free from the formation of stones in glass as a refractory product for molten glass and which is free from coloring the glass substrate, while maintaining excellent corrosion resistance of the conventional products.

Another object of the present invention is to provide a high performance high zirconia refractory product without cracks, which is suitable as a refractory product for a molten low alkali glass, or as a refractory product for electric fusion of a glass.

The present invention provides a high zirconia fused refractory product consisting essentially of the following constituents analytically, on a weight basis:
85 to 97% of $ZrO_2$;
0.05 to 3% of $P_2O_5$;
2 to 10% of $SiO_2$;
0.05 to 5% of $B_2O_3$; and
the content of alkali metal oxides being less than 0.1%.

Now, the present invention will be described in detail with reference to the preferred embodiments.

The refractory product of the present invention is required to have the specific composition defined by the analytical values. The refractory product has a dense and uniform structure in which the grain boundary of coarse crystals of baddeleyite is filled with a small amount of a soft glass matrix comprising $P_2O_5$ and $B_2O_3$ as important components.

Now, preferred ranges of the respective constituents will be described.

Firstly, if the amount of $ZrO_2$ is too small, it is difficult to obtain high corrosion resistance. On the other hand, if the amount is so large that the glass matrix component is too small, it is very difficult to obtain a cast product of a block shape having no cracks.

$P_2O_5$ has been found to be effective as a glass matrix component which is capable of forming a so-called soft glass matrix. Thus, $P_2O_5$ has made it possible to obtain a cast product free from cracks even if it constitutes a small proportion in the entire glass components. Further, even when used as a refractory material for a molten glass, the cast product thereby obtained is free from coloring the glass or free from the formation of stones in glass. The $P_2O_5$ component facilitates the fusion and thus provides an advantage that the power consumption can be reduced. If the amount of $P_2O_5$ is excessive, no adequate corrosion resistance as a high zirconia refractory product will be obtained. On the other hand, if the amount is too small, no adequate improvement of the glass matrix will be obtained. Therefore, the necessary amount is usually from 0.1 to 3%, preferably from 0.2 to 2%. However, in a case where $ZrO_2$ is 95% or higher, the proportion in the matrix increases even if the amount is less than 0.1%, and thus it effectively serves for the matrix, and a certain effect is observed even in an amount of at least 0.05%.

$SiO_2$ is required to be present in an amount of at least 2% as a basic component for the glass matrix. However, if it is excessive, it causes a deterioration of the corrosion resistance. Therefore, the upper limit should be 10%, preferably 5%.

$Al_2O_3$ is not an essential component to the refractory product of the present invention. If it is excessive, the glass matrix tends to be hard, thus causing cracks. Therefore, it is preferably less than 1%.

The content of alkali metal oxides such as $Na_2O$ and $K_2O$, is critical to the present invention, and should be suppressed to a level of less than 0.1% by weight. For this purpose, it is desired, for instance, to avoid the use of an alkali metal salt as a starting material or to add a process step for purifying the starting material. Heretofore, the presence of alkali metal oxides was believed to be rather desirable as they are effective to provide a soft glass matrix so long as the amount is not so large that the corrosion resistance deteriorates. However, when the product is used as a refractory material for a molten low alkali glass, the alkali component is likely to melt out. Likewise, when the product is used as a refractory material for an electrically molten glass, the resistivity of the refractory material at high temperatures tends to decrease, whereby there is a danger that the refractory material conducts electricity. On the other hand, also in the glass industry, there has been a progress in the development of fine chemical glasses, and there has been a sharp increase in the production of e.g. low alkali glasses and high melting point glasses. Accordingly, it has been desired to improve the properties of the refractory product used for melting such glasses. However, it was known that if the content of the alkali metal oxides was reduced, it was difficult to produce a cast product having no cracks.

Under the circumstances, the present inventors have found it possible to solve this problem by the addition of $B_2O_3$, which is another feature of the present invention. $B_2O_3$ is effective not only to soften the glass matrix in corporation with the $P_2O_5$ component instead of the alkali metal oxides, but also to prevent the decrease of the resistivity at high temperatures while maintaining the corrosion resistance. However, if the amount is excessive, it becomes difficult to obtain a dense cast product. Accordingly, the necessary amount of $B_2O_3$ is usually from 0.1 to 5%, preferably from 0.2 to 3%, more preferably from 0.2 to 2%. However, as in the case of $P_2O_5$, it is effective even in a small amount when $ZrO_2$ is at a high concentration, and therefore the amount may be at least 0.05%.

The smaller the content of alkali metal oxides, the better. However, it is practically difficult to completely eliminate them in view of the purity of the starting materials.

A potassium ion has a larger radius than a sodium ion, and it has a smaller ion electric conductivity than $Na^+$. Accordingly, the inclusion of alkali metal oxides is prefered to be $K_2O \geq Na_2O$ from the viewpoint of the high resistivity at high temperatures.

The refractory product of the present invention is free from cracks and superior in the corrosion resistance and compressive strength, and as mentioned in the foregoing, it is especially suitable for molten glasses. It is readily available as a product having an electric resistivity at 1500° C. of at least 100 $\Omega$.cm, preferably at least 150 $\Omega$.cm.

Now, the present invention will be described in detail with reference to Examples. However, it should be understood that the present invention is by no means restricted to these specific Examples.

EXAMPLES

A batch mixture prepared by mixing prescribed amounts of a $ZrO_2$ source such as a baddeleyite ore or silica reduced zirconia and $P_2O_5$ and $B_2O_3$ sources, was charged in a 200 KV single phase arc electric furnace, and completely melted at a melting temperature of from 2200° to 2300° C. The molten mixture was cast in a graphite mold having an internal capacity of 160 mm×200 mm×350 mm and surrounded by Bayer alumina, and annealed to room temperature.

The analytical results of the cast products and the various properties are shown in Table 1. (The samples $P_1$ to $P_8$ represent Comparative Examples.)

TABLE 1

| | $P_1$ | $P_2$ | $P_3$ | $P_4$ | $P_5$ | $P_6$ | $P_7$ | $P_8$ |
|---|---|---|---|---|---|---|---|---|
| Chemical constituents (wt. %) | | | | | | | | |
| $ZrO_2$ | 41 | 90 | 95.5 | 94.0 | 92.2 | 93.8 | 94.5 | 95.5 |
| $P_2O_5$ | — | 1.5 | 0 | 0.3 | 0.2 | 0.5 | 0.0 | 0.4 |
| $Al_2O_3$ | 46 | 2.5 | 1.2 | 0.7 | 2.7 | 1.0 | 0.6 | 0.6 |
| $SiO_2$ | 12 | 5 | 3.0 | 4.4 | 4.3 | 4.5 | 4.4 | 2.8 |
| $B_2O_3$ | — | — | — | — | — | — | 0.2 | 0.2 |
| $Na_2O$ | 0.8 | 0.5 | 0.2 | 0.2 | 0.3 | 0.05 | 0.02 | 0.2 |
| $K_2O$ | — | — | — | — | — | 0.02 | 0.07 | 0.6 |
| $Fe_2O_3$ | <0.1 | <0.5 | | <0.3 | <0.2 | <0.1 | <0.1 | <0.1 |
| $TiO_2$ | | | | | | | | |
| MgO | <0.1 | <0.5 | <0.1 | <0.1 | <0.1 | <0.1 | <0.1 | <0.1 |
| CaO | | | | | | | | |
| Rare earth oxides | — | 0.9 | — | — | — | — | — | — |
| Cracks | None | Large cracks | Large cracks | None | None | Slight cracks | Slight cracks | None |
| Bulk density | 4.00 | 4.14 | 4.35 | 4.35 | 4.33 | 4.32 | 4.35 | 4.33 |
| Compressive strength (kg/cm²) | 3500 | — | — | 4300 | 3800 | — | — | — |
| Corrosion resistance*1 | 1.0 | 1.25 | 2.20 | 2.20 | 2.05 | 2.20 | 2.15 | 2.20 |
| **Effects to molten glass*2** | | | | | | | | |
| Coloring | None | Slight | None | None | None | None | None | None |
| Stone formation | Stones | Stones | None | None | None | None | None | None |
| Resistivity at 1500° C. ($\Omega$ . cm) | 90 | 45 | 50 | 53 | 42 | 88 | 135 | 30 |
| | $S_1$ | $S_2$ | $S_3$ | $S_4$ | $S_5$ | $S_6$ | $S_7$ | $S_8$ |

TABLE 1-continued

| Chemical constituents (wt. %) | | | | | | | | |
|---|---|---|---|---|---|---|---|---|
| ZrO$_2$ | 95.3 | 94.9 | 93.3 | 92.7 | 93.8 | 92.1 | 91.8 | 92.4 |
| P$_2$O$_5$ | 0.2 | 0.2 | 0.8 | 0.5 | 1.2 | 0.2 | 0.4 | 2.5 |
| Al$_2$O$_3$ | 0.6 | 0.7 | 0.6 | 0.8 | 0.6 | 0.5 | 0.5 | 0.7 |
| SiO$_2$ | 3.5 | 3.5 | 3.9 | 4.8 | 4.3 | 4.5 | 3.7 | 4.0 |
| B$_2$O$_3$ | 0.3 | 0.5 | 1.2 | 1.1 | 0.5 | 2.5 | 3.5 | 0.3 |
| Na$_2$O | 0.01 | 0.03 | 0.01 | 0.01 | 0.02 | 0.02 | 0.01 | 0.03 |
| K$_2$O | 0.01 | 0.01 | 0.03 | 0.04 | 0.02 | 0.04 | 0.03 | 0.03 |
| Fe$_2$O$_3$ | <0.1 | <0.1 | <0.1 | <0.1 | <0.1 | <0.1 | <0.1 | <0.1 |
| TiO$_2$ | | | | | | | | |
| MgO | <0.1 | <0.1 | <0.1 | <0.1 | <0.1 | <0.1 | <0.1 | <0.1 |
| CaO | | | | | | | | |
| Rare earth oxides | — | — | — | — | — | — | — | — |
| Cracks | None | None | None | None | None | None | None | None |
| Bulk density | 4.34 | 4.33 | 4.34 | 4.33 | 4.34 | 4.21 | 4.14 | 4.13 |
| Compressive strength (kg/cm$^2$) | 4100 | — | — | — | 4200 | — | — | — |
| Corrosion resistance*1 | 2.30 | 2.25 | 2.27 | 2.25 | 2.30 | 2.15 | 2.04 | 2.12 |
| Effects to molten glass*2 | | | | | | | | |
| Coloring | None | None | None | None | None | None | None | None |
| Stone formation | None | None | None | None | None | None | None | None |
| Resistivity at 1500° C. (Ω . cm) | 220 | 143 | 270 | 200 | 175 | 158 | 165 | 137 |

*1 The corrosion resistance was determined in such a manner that a rectangular sample of 15 mm × 15 mm × 50 mm was cut out from each cast product, and it was suspended in a platinum crucible and heated in a siliconite electric furnace at 1500° C. for 48 hours, whereupon the corroded thickness was measured. Soda-lime glass was used as the corroding agent. The corroded thickness at slug line was measured by slide calipers, and the corrosion resistant index was calculated as follows:

$$\text{Corrosion resistance index} = \frac{\text{Corroded thickness of } P_1 \text{ (mm)}}{\text{Corroded thickness of sample (mm)}}$$

*2 The effects to molten glass were determined by observing the coloring of the glass and the formation of stones in the glass remained in the platinum crucible after the corrosion test.

As described in the foregoing, according to the present invention, by substituting alkali metal oxides used to be considered as an aid required to obtain cast products free from cracks by a prescribed amount of B$_2$O$_3$ thereby to suppress the content of the alkali metal oxides to a level of less than 0.1% by weight of the entire composition and by forming a desirable matrix wherein said B$_2$O$_3$ and prescribed amount of P$_2$O$_5$ are corporated together with the basic component of a prescribed amount of SiO$_2$, it is possible to obtain a high zirconia fused refractory product suitable for molten glasses, as a product free from cracks and having excellent properties such as high corrosion resistance, which is particularly suitable for melting low alkali glasses or electrically melting high melting point glasses, the production of which has sharply increased reflecting a demand for high quality glasses in recent years. Thus, the industrial value of the present invention is significant.

We claim:

1. A high zirconia fused refractory product having high resistivity and excellent corrosion resistance at high temperature, consisting essentially of:
85-97% by weight of ZrO$_2$;
0.05-3% by weight of P$_2$O$_5$;
2-10% by weight of SiO$_2$;
0.05-5% by weight of B$_2$O$_3$;
alkali metal oxides in an amount of less than 0.1% by weight; and
Al$_2$O$_3$ in an amount of less than 1% by weight.

2. The refractory product according to claim 1, wherein the content of P$_2$O$_5$ is from 0.1 to 3%.

3. The refractory product according to claim 1, wherein the content of P$_2$O$_5$ is from 0.2 to 2%.

4. The refractory product according to claim 1, wherein the content of B$_2$O$_3$ is from 0.1 to 3%.

5. The refractory product according to claim 1, wherein the content of B$_2$O$_3$ is from 0.2 to 2%.

6. The refractory product according to claim 1, wherein the alkali metal oxides satisfy Na$_2$O ≦ K$_2$O.

7. The refractory product according to claim 1, which has an electric resistivity of at least 100 Ω.cm at 1500° C.

8. The refractory product according to claim 7, which has an electric resistivity of at least 150 Ω. cm at 1500° C.

* * * * *